Dec. 6, 1955  H. O. MILLER  2,725,619
AUTOMOTIVE TRUCK WORK BENCH
Filed Aug. 16, 1952  2 Sheets-Sheet 1
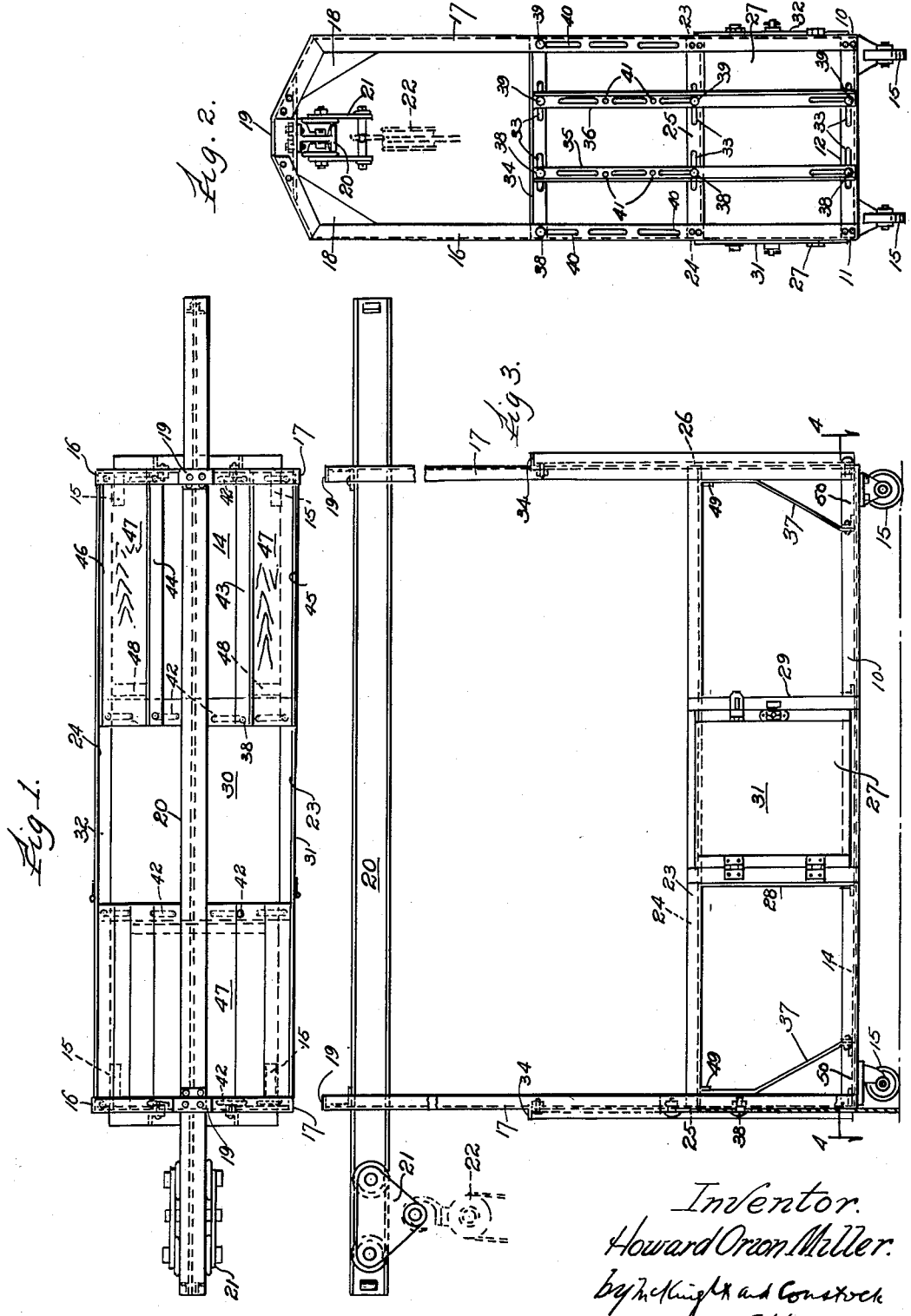
Inventor.
Howard Orion Miller.
by McKnight and Comstock
Attorneys.

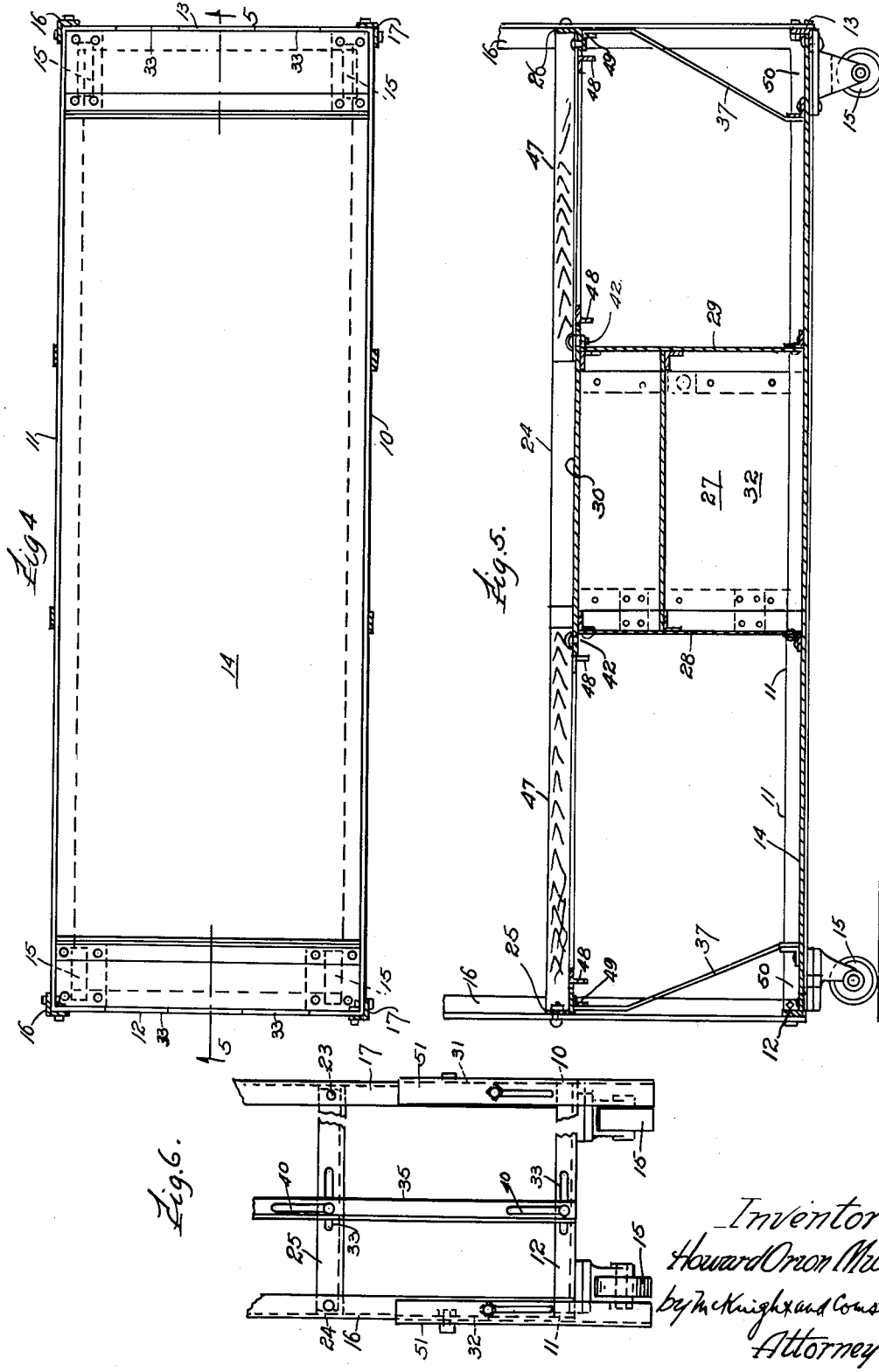

United States Patent Office 2,725,619
Patented Dec. 6, 1955

2,725,619

AUTOMOTIVE TRUCK WORK BENCH

Howard Orion Miller, Chicago, Ill.

Application August 16, 1952, Serial No. 304,670

1 Claim. (Cl. 29—288)

My invention relates to a movable bench for work on transmissions, differentials and other automotive parts.

Among the objects of my invention is to provide a truck work bench adapted to move to and lift heavy automotive parts and which is adjustable to accommodate and hold different sizes of transmissions and differentials, and other automotive parts.

My invention also contemplates such other objects, advantages and capabilities as will later more fully appear and which are inherently possessed by my invention.

While I have shown in the accompanying drawings a preferred form of my invention, yet I wish it understood that the same is susceptible of modification and change without departing from the spirit of my invention.

Referring to the drawings, Fig. 1 is a top plan view of my automotive truck work bench; Fig. 2 is a side elevational view and Fig. 3 is a front view of the same; Fig. 4 is a top plan view of the lower frame; Fig. 5 is a detailed sectional view of the complete bench on line 5—5 of Fig. 4; and Fig. 6 is a detailed view of my slidable anchor member and a swivel type caster.

The embodiment selected to illustrate my invention comprises a lower rectangular frame formed of a pair of spaced front and back angle irons 10 and 11 respectively welded to a pair of spaced end angle irons 12 and 13. These angle irons are positioned with the flat side down, and the angles sticking straight up. A floor or base 14 is supported on and attached to the flat bottom portions of said angle irons. A plurality of casters 15, preferably four in number are attached to the base 14 and angle irons 10, 11, 12 and 13 adjacent each of the four corners thereof. On one end I prefer that the casters be of the fixed type, and at the other end my casters are preferably of the swivel type.

Extending upwardly from the bottom corners of my frame at each end are a pair of upright angle irons 16 and 17 bolted at their lower portions to the frame. Diagonally inwardly extending plates 18 are welded to uprights 16 and 17 adjacent their upper ends and are attached to top cross members 19. An I beam 20 is attached to spaced top cross members 19 and extends therebeyond. A trolley 21 rides on the I beam 20 and has attached thereto a hoist 22 for lifting work such as a transmission or differential for desired placement.

A bench level frame is formed with a continuous angle iron attached to uprights 16 and 17 and having front, back and opposite end portions 23, 24, 25 and 26 respectively.

A cabinet 27 is formed preferably to the right of center with spaced side portions 28 and 29 attached to lower front and back angle irons 10, and 11 and to front and back bench level angle irons 23 and 24. A top member 30 overlaps the top of side walls 28 and 29. Front and back doors 31 and 32 are hinged to side walls 28 and 29.

Bottom end angle iron 12, and bench level end angle iron 25 each has a plurality of spaced slots 33. A higher or upper end angle iron 34 is positioned above bench level end angle iron 25 and extends between uprights 16 and 17.

A pair of spaced inner upright angle irons 35 and 36 extend upwardly from bottom 12 to upper angle iron 34 and are slidably adjustable within the distance of slots 33 and are held in desired position by carriage bolts 38 and nuts 39 in slots 33 in members 12, 25 and 34. Carriage bolts 38 have round heads and square shoulders.

Uprights 16 and 17 have slots 40 above bench level so that upper angle irons 34 may be adjusted vertically and held in position by carriage bolts 38 and nuts 39 with slots 40.

A plurality of vertically spaced holes 41 are provided in inner uprights 35 and 36 to receive cap screws to be attached to transmissions, differentials or other work to hold them in place.

The overlapping portions of top member 30 of cabinet 27 have slots 42, and each of bench level end angle irons 25 and 26 also has slots 42. A pair of inner horizontal angle irons 43 and 44 extend between members 30 and 25 or 26 and are adjustable within the limits of slots 42 with which they are held in desired position by carriage bolts 38 and nuts 39.

Another pair of horizontal angle irons 45 and 46 extend between numbers 30 and 25 or 26 and lie adjacent members 23 and 24.

Boards 47 having holding lugs 48 are positioned between members 43 and 45 and between members 44 and 46 forming the double board work bench.

An apron 37 of sheet metal is bolted to floor 14 at each end and extends diagonally upwardly and is bolted to extension 49 attached to the end bench level angle iron 25 or 26. Floor 14 behind apron 37 provides a receptacle portion 50 for bolts, nuts and other small parts and prevents them from becoming lost.

A leg extension 51 is slidably attached to the uprights 16 and 17 having the swivel type casters adjacent the floor and may be dropped to the floor as an anchor.

I claim:

A work bench for the repair of different sizes and makes of heavy differentials and transmissions comprising connecting bottom angle irons on the front, back and two sides, four upright angle irons attached at their lower ends to the corners of said bottom angle irons, connecting members joining the upright angle irons at each end, a floor attached to said bottom angle irons, connecting bench level angle irons on the front, back and two sides attached to said end angle irons, a cabinet attached to and extending between the bottom and the bench level front and back angle irons, a sheet metal apron attached to each end bench level angle iron and extending diagonally inwardly to said floor and forming a receptacle with the floor at each end of the truck for holding parts and tools used in repairing the differentials and transmissions, a pair of angle irons positioned between the uprights and slidably attached to the end angle irons and adjustable toward each other, and a plurality of horizontal angle irons positioned between said front and back angle irons and slidably attached to the cabinet and the bench level end angle irons and adjustable toward each other and a plurality of boards movably mounted between said horizontal angle irons, said angle irons adjustable to accommodate different sizes and makes of differentials and transmissions.

References Cited in the file of this patent

UNITED STATES PATENTS

| | | |
|---|---|---|
| 288,861 | Roberts | Nov. 20, 1883 |
| 430,130 | Kiltz | June 17, 1890 |
| 573,942 | Watson | Dec. 29, 1896 |
| 1,363,020 | Shewalter | Dec. 21, 1920 |
| 1,596,381 | Sparks | Aug. 17, 1926 |
| 1,738,926 | Saker | Dec. 10, 1929 |
| 2,275,894 | Ferguson | Mar. 10, 1942 |
| 2,506,930 | LeTourneau | May 9, 1950 |